(12) United States Patent
Doyer et al.

(10) Patent No.: US 8,454,240 B2
(45) Date of Patent: Jun. 4, 2013

(54) CAGE FOR BALL BEARING

(75) Inventors: Armel Louis Doyer, Savonnieres (FR); Alexandre Manceau, Saint Cyr sur Loire (FR); Frank Berens, Saunay (FR); Jos Holsnijders, En Leerdam (NL); Joop Vree, Nieuwegein (NL)

(73) Assignee: Aktiebolaget SKF, Göteborg (SE)

( * ) Notice: Subject to any disclaimer, the term of this patent is extended or adjusted under 35 U.S.C. 154(b) by 719 days.

(21) Appl. No.: 12/449,120

(22) PCT Filed: Dec. 14, 2007

(86) PCT No.: PCT/FR2007/052519
§ 371 (c)(1),
(2), (4) Date: Feb. 16, 2010

(87) PCT Pub. No.: WO2008/090295
PCT Pub. Date: Jul. 31, 2008

(65) Prior Publication Data
US 2010/0142874 A1 Jun. 10, 2010

(30) Foreign Application Priority Data
Jan. 26, 2007 (FR) ...................................... 07 52908

(51) Int. Cl.
*F16C 19/00* (2006.01)
*F16C 33/66* (2006.01)

(52) U.S. Cl.
CPC .................................. *F16C 33/6614* (2013.01)
USPC .......................................... 384/470; 384/523

(58) Field of Classification Search
USPC ................. 384/470, 523, 526, 527, 531, 532, 384/534
See application file for complete search history.

(56) References Cited

U.S. PATENT DOCUMENTS

| | | | | |
|---|---|---|---|---|
| 3,554,621 A | * | 1/1971 | McAllister | 384/484 |
| 4,938,613 A | | 7/1990 | Griffin | |
| 6,371,655 B1 | * | 4/2002 | Fierling | 384/523 |
| 6,402,386 B1 | * | 6/2002 | Daikuhara | 384/470 |
| 6,533,462 B2 | * | 3/2003 | Kawakami | 384/470 |
| 8,157,449 B2 | * | 4/2012 | Doyer et al. | 384/531 |
| 2002/0114550 A1 | | 8/2002 | Daikuhara | |

FOREIGN PATENT DOCUMENTS

| | | |
|---|---|---|
| JP | 2003035317 A | 2/2003 |
| JP | 2003329045 A | 11/2003 |
| JP | 2005214259 A | 8/2005 |
| WO | WO2007135305 | * 11/2007 |

* cited by examiner

*Primary Examiner* — James Pilkington
(74) *Attorney, Agent, or Firm* — Mark A. Ussai; Bryan Peckjian

(57) ABSTRACT

A cage for a ball bearing comprising a body of generally annular shape and clamps, the body comprising a heel of substantially annular shape and a substantially axial portion being connected to the heel and wherein recesses are arranged for the balls, the substantially axial portion supporting said clamps on the side axially opposite to the heel, the cage comprising an axial partition placed between the recesses and extending axially from the end of the heel opposite to the clamps toward the clamps while radially delimiting external free spaces and internal free spaces situated radially on either side of said partition.

8 Claims, 8 Drawing Sheets

CAGE FOR BALL BEARING

BACKGROUND OF THE INVENTION

The present invention relates to the field of cages for bearings, in particular cages made of synthetic material used in ball bearings, notably with a deep race, in order to ensure the appropriate circumferential spacing between the balls. The invention also relates to bearing cages designed for high-speed operation.

Such types of cages have a generally annular shape with spherical recesses in which the balls are partially housed. The balls are retained in the recesses by clamps placed in pairs opposite to the heel of the cage. The spherical recesses have a diameter that is very slightly greater than that of the balls, so that a certain functional clearance exists between the balls and the recesses.

Document JP 2003-035 317 (NSK) or patent application US 2002/114550 describe a cage provided, between two recesses, with a deep groove extending from a radial face opposite to the clamps to the vicinity of the clamps. Notches are provided from the groove to the bore of the cage.

U.S. Pat. No. 4,938,613 and patent application JP 2005-514259 describe cages of constant thickness.

When the bearing rotates at high speed, under the effect of centrifugal force, the cage is subjected to stresses which tend to deform said cage, mainly in the radial direction, and shape it like an umbrella, that is to say give the cage a conical shape by increasing the diameter on the side of the clamps. Such deformations have consequences that are harmful to the correct operation of the bearing. Specifically, the edges of the recesses tighten against the balls, causing an increase in the friction torque and a scraping effect of the lubricant, rapidly leading to an accelerated degradation of the lubrication conditions of the bearing. There is also a risk of the ends of the clamps coming into contact with the bore of the outer race of the bearing, risking causing excessive wear of the cage.

Moreover, because of the high rotation speeds to which the bearing is subjected, the grease tends to be centrifuged outward into zones where it tends to stagnate or where the grease contributes only very little to the effective lubrication of the balls.

SUMMARY OF THE INVENTION

The object of the invention is to remedy these disadvantages.

A further object of the invention is to reduce the radial deformations of the end of the cage opposite to the heel while helping to improve the circulation of the lubricant inside the bearing.

The cage for a ball bearing comprises a body of generally annular shape and clamps. The body comprises a heel of substantially annular shape and a substantially axial portion being connected to the heel and wherein recesses are arranged for the balls. The substantially axial portion supports said clamps on the side axially opposite to the heel. The external diameter of the heel is greater than that of the axial portion so that said axial portion is radially thinner than the heel. The cage comprises an axial partition placed between the recesses and extending axially from the end of the heel opposite to the clamps to the clamps while radially delimiting external free spaces and internal free spaces situated radially on either side of said partition.

This lightens the cage while creating reservoirs of lubricant and circulation channels.

Such a structure is particularly advantageous because of the existence of a heel of greater thickness and an axial partition which extends axially from the external cylindrical surface of the heel opposite to the clamps, to the clamps, so as to define external and internal free spaces. The external space preferably emerges on each side of the heel so as to improve lubrication.

In one embodiment, the external free spaces form cavities passing axially through the heel of the cage and emerging axially on either side of said heel. The lubricant can move toward the rolling elements.

In one embodiment, the internal free spaces form reinforcements that are axially open toward the face of the heel opposite to the clamps and radially inward. A considerable quantity of lubricant can be stored therein.

In one embodiment, the axial partition comprises at least one opening allowing communication between the external free spaces and the internal free spaces situated opposite.

Said opening may have the shape of a notch arranged in the axial partition from the end of the heel opposite to the clamps.

In one embodiment, the axial partition extends between the recesses in the circumferential direction and is placed substantially in a circle. A stiffening of the recesses is therefore provided. The fact that the partition extends from the external surface of the heel opposite to the clamps to the base of the clamps ensures excellent rigidity of the cage.

In one embodiment, the external diameter of the axial partition is substantially equal to the pitch diameter of the cage.

In one embodiment, the external diameter of said substantially axial portion is less than the external diameter of the heel.

The rolling bearing may comprise balls mounted in the recesses of a cage and placed between two raceways.

In one embodiment, two different lubricants are placed, at least one being positioned in the internal free spaces.

By virtue of the invention, the grease can circulate axially via the internal and external free spaces in order to return close to the balls. The internal free spaces form at the same time reserves of grease situated close to the balls and thereby allowing the grease to slowly spread lubricant toward the balls.

Furthermore, the free spaces form channels allowing the free axial circulation of the grease between the two sides of the heel of the cage, which greatly improves the general lubrication. In addition, the general structure of the cage is lightened by its free spaces, hence a saving in material and a reduction in the weight of the cage which is of value for many applications and the effect of which is also to reduce the centrifugal effect of the high rotation speeds. The cage is very rigid thanks to the ribs formed by the recess edges and the axial partition connecting the recess edges and extending from the end of the heel opposite to the clamps to the base of the clamps.

In addition, since the zone of contact between the balls and the recesses is substantially at the radial level of the axial partition, the circumferential forces due to the impacts generated by the balls on the recesses during operation are thus absorbed by said partition and do not cause considerable deformations or notorious local stresses of the cage.

It is possible to retain at the recess edge an axial thickness identical to that of the inside of the recess, thereby forming a rib providing good rigidity. The user benefits from the effects of reducing the weight of the cage, increasing the space available for the grease while maintaining sufficient rigidity to reduce the radial deformations of the cage. The saving in weight of a cage may be of the order of 20 to 30%, for example 25%, while the radial deformation can be reduced by approximately 30 to 40%, for example 35%. By virtue of the cage, it is possible to use a bearing at a rotation speed that is 17% higher than a bearing fitted with a conventional cage, for example 700 000 ndm instead of 600 000 ndm, ndm being a speed factor resulting from the product of the rotation speed in rpm times the pitch diameter of the bearing in mm. The ndm is representative of the linear speed of movement of the balls.

For a given speed, the cage also allows use with operating temperatures that are higher than is the case with a conventional cage, and this is because of the reduction in the deformation and the increase in the space available for the lubricant. For example, for a glass-fiber-laden PA66 polyamide cage, it is possible to push the service temperature limit from 120° C. to 150° C. In addition, the reduction in the quantity of material forming the cage has a significant reduction effect on the cost of raw material.

BRIEF DESCRIPTION OF THE SEVERAL VIEWS OF THE DRAWINGS

The present invention will be better understood on reading the detailed description of a few embodiments taken by as nonlimiting examples and illustrated by the appended drawings in which.

DETAILED DESCRIPTION OF THE INVENTION

Figure 1:
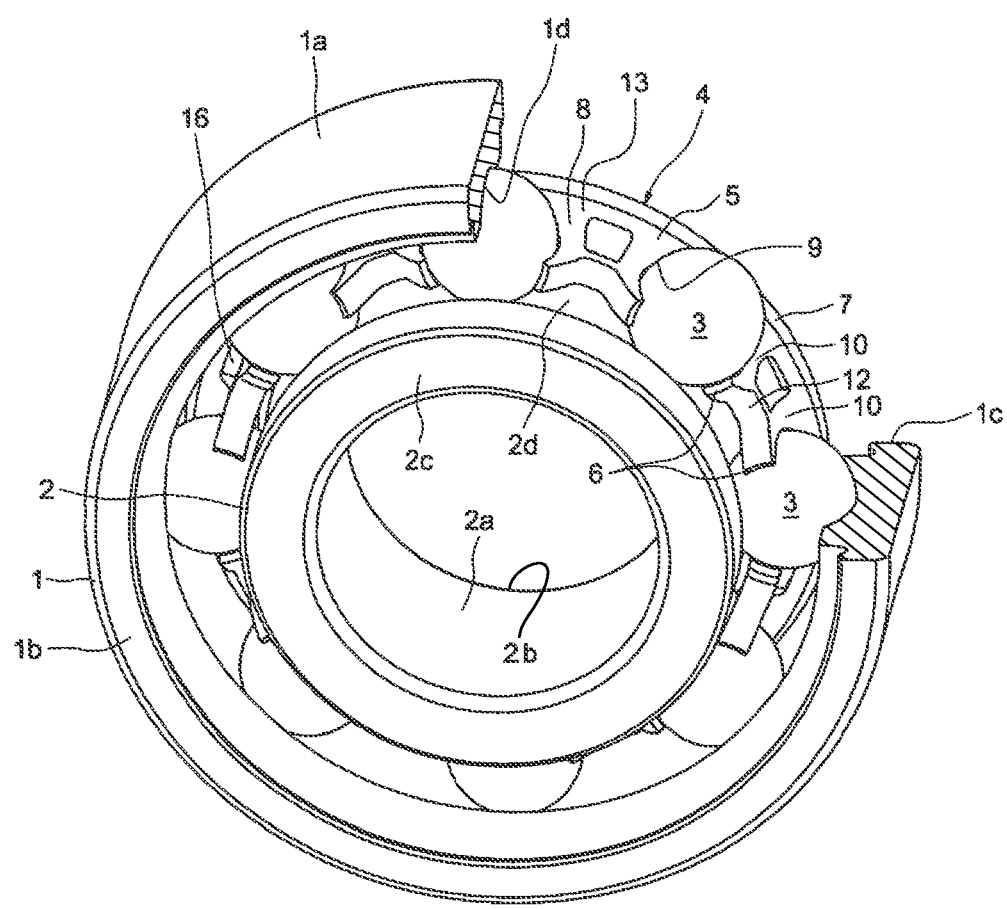
FIG. 1 is an exploded perspective view of a rolling bearing according to one aspect of the invention.
Figure 2:
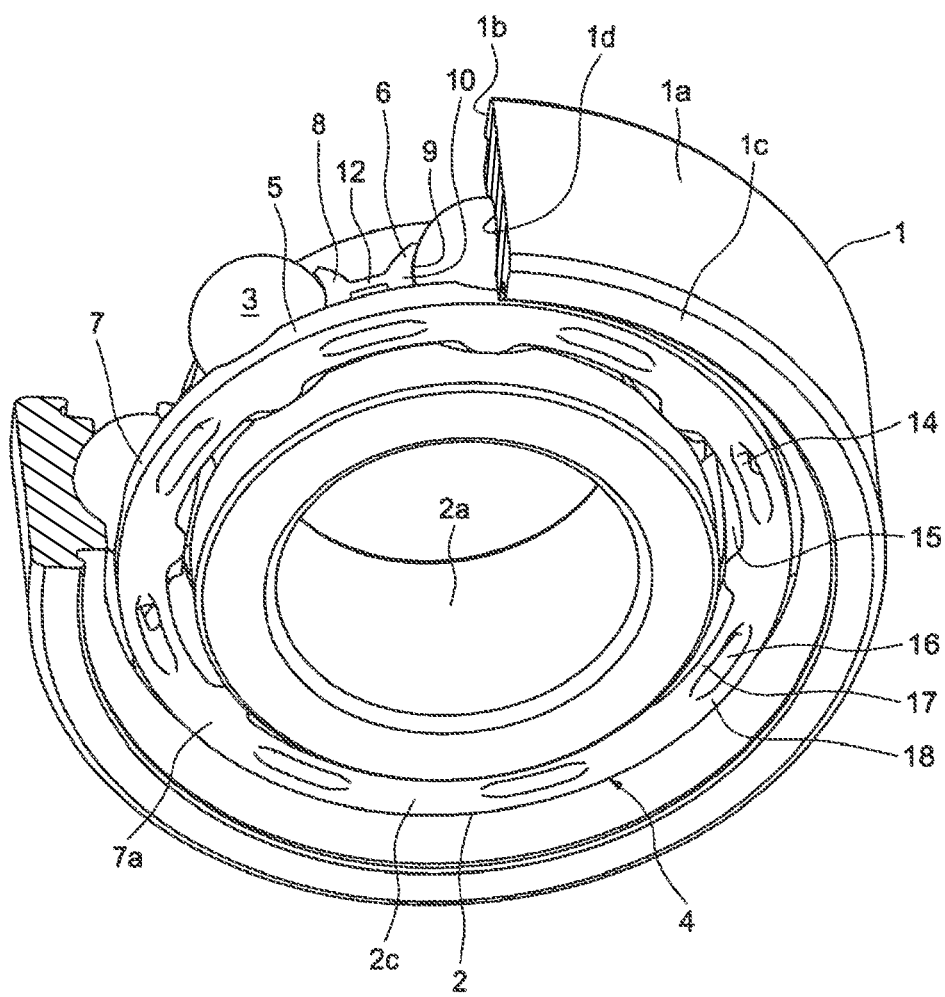
FIG. 2 is another view in perspective of the bearing of FIG. 1.

As can be seen in FIG. 1, the rolling bearing comprises an outer race 1, an inner race 2, an array of rolling elements 3, in this instance balls, and a cage 4 for maintaining the circumferential spacing of the rolling elements 3. Sealing flanges or seals, not shown, may be attached to the outer race 1 and form a friction seal or narrow passage seal with a bearing surface of the inner race 2.

The outer race 1 and inner race 2 are of the deep race type, for example obtained by machining a tube portion or a forged or rolled annular blank. The outer race 1 comprises a cylindrical axial external surface 1a, opposite radial transverse surfaces 1b and 1c, and a bore from which a raceway 1d is formed for the rolling elements 3. The inner race 2 comprises a cylindrical bore 2a, two opposite radial transverse surfaces 2b and 2c and an external surface from which a raceway 2d is formed for the rolling elements 3. The outer race 1 is furnished with two symmetrical grooves in which the sealing flanges can be fitted on the side of the radial surface 1b and of the radial surface 1c.

Figure 3:
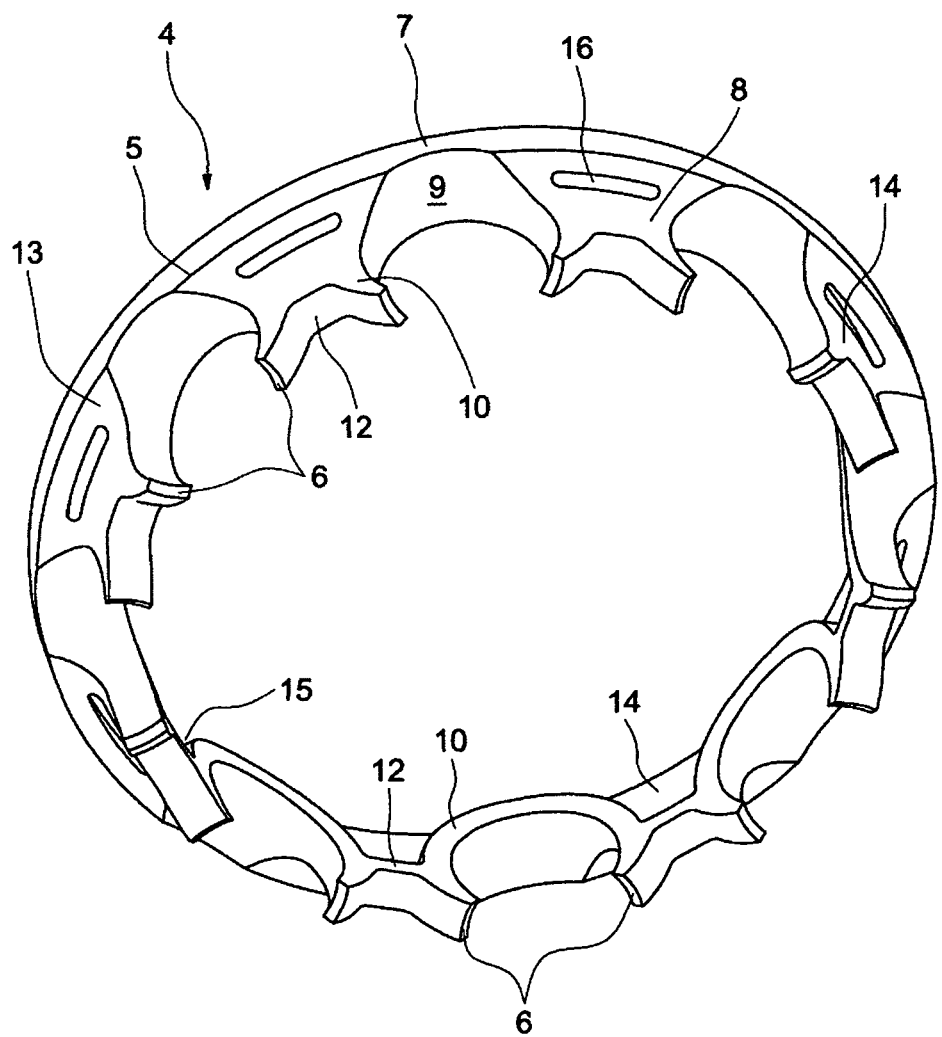
FIG. 3 is a view in perspective of a cage of the rolling bearing shown from the front.
Figure 4:
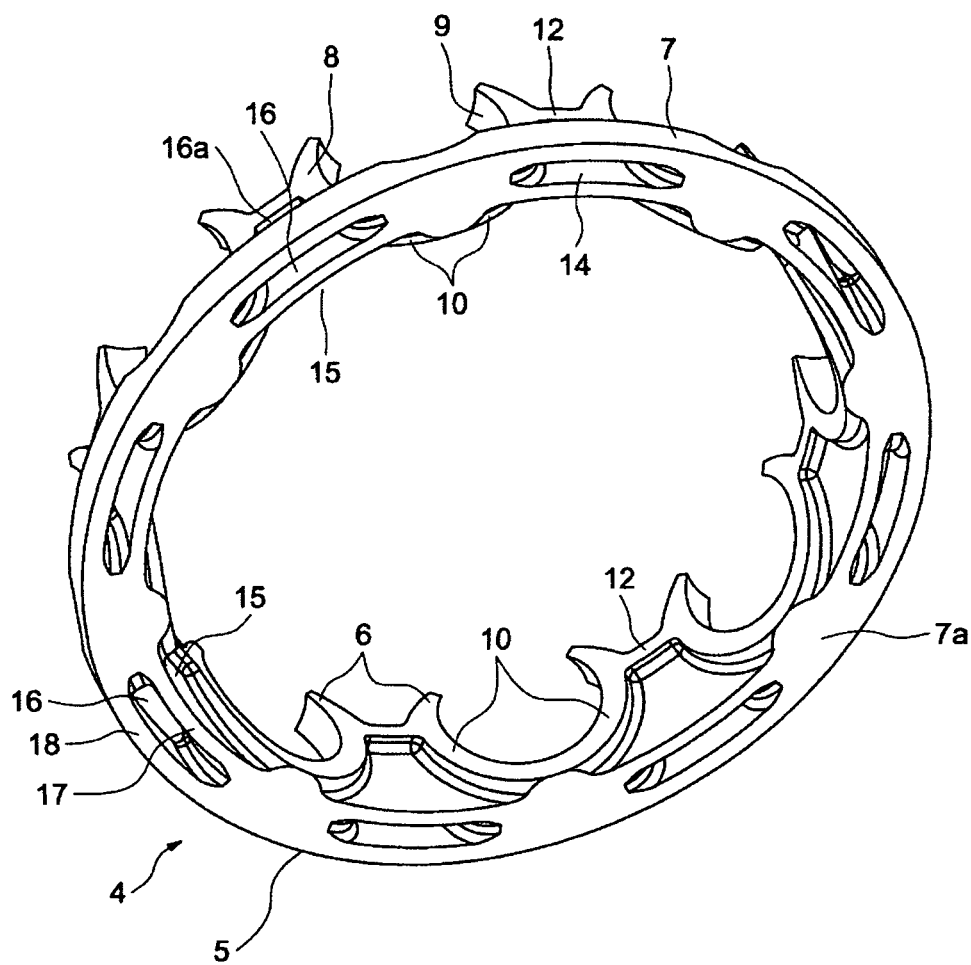
FIG. 4 is a view in perspective of another cage shown from the rear.

The cage 4 is more clearly visible in FIGS. 3 and 4 and comprises a body 5 of generally annular shape and clamps 6. The cage 4 may be a single-piece part, for example made of injection-molded polyamide such as PA 6.6. The body 5 comprises a heel 7 of generally annular shape and an axial portion 8 defining a plurality of recesses 9 for the rolling elements 3. The recesses 9 are of spherical or virtually spherical shape. The clamps 6 also help to define the recesses 9.

The heel 7 has an external diameter that is greater than that of the axial portion 8 and an internal diameter that is substantially equal. However, as a variant, it would be possible to provide a heel having an internal diameter that is slightly different from that of the axial portion 8. The axial portion 8 has an axial length at least equal to half the diameter of the recesses 9, so that the rolling elements 3 can be properly held in the recesses 9. The external diameter of the substantially axial portion 8 is close to the pitch diameter of the cage, for example in the range defined between the pitch diameter of the cage minus the radial thickness of the heel and the pitch diameter of the cage plus half the radial thickness of the heel. The pitch diameter of the cage is the diameter of the imaginary circle passing through the center of the imaginary spheres defining the recesses 9.

Between two adjacent recesses 9, the axial portion 8 forms a protuberance comprising two branches 10 in an arc of a circle each terminating in a clamp 6 opposite to the heel 7. The axial portion 8 also comprises a rib 12 connecting the ends of the branches 10 associated with two adjacent recesses, axially opposite the heel 7. The rib 12 performs a spacer function. The clamps 6 extend beyond the rib 12. The branches 10, the clamps 6 and the rib 12 may have a substantially equal radial thickness. The branches 10 form ribs providing a sufficient surface area to define the recesses 9 for retaining the rolling elements 3. The branches 10 may have a substantially constant thickness from one rib 12 to the next rib 12.

The cage 1 also comprises a connection 13 situated at the base of each branch 10 and forming an interface between the heel 7 and the branch 10. The connection 13 has a profile that is rounded in cross section and has a radial thickness that decreases from the heel 7 to the branch 10. The connection 13 may have an axial length of the order of 15 to 30% of the axial length of the substantially axial portion 8.

The cage also comprises an axial partition 14 connecting two branches 10 of two adjacent recesses 9. The axial partition 14 has a small radial thickness, for example less than half the radial thickness of the branches 10, and extends axially between the base surface or external cylindrical surface 7a of the heel 7 and the base of the clamps 6. The partition 14 is placed at a radial distance from the inner face of the axial portion 8 and is substantially flush with the outer periphery of said axial portion 8, leaving internal free spaces 15 and external free spaces 16 as can be seen in FIGS. 3, 5 and 6.

The partition 14 may be slightly radially recessed relative to the periphery of the axial portion 8 as in FIG. 4.

In other words, the internal free spaces 15 extend axially between the rib 12 and the end face 7a of the heel 7 on which said internal free spaces 15 emerge. The internal free spaces 15 are delimited radially outward by the axial partition 14 and emerge inward in the bore of the cage 4. The internal free spaces 15 are also delimited in the circumferential direction by the branches 10 of two adjacent recesses 9. The internal free spaces 15 pass through the heel 7 and at least partially the substantially axial portion 8.

Figure 5:
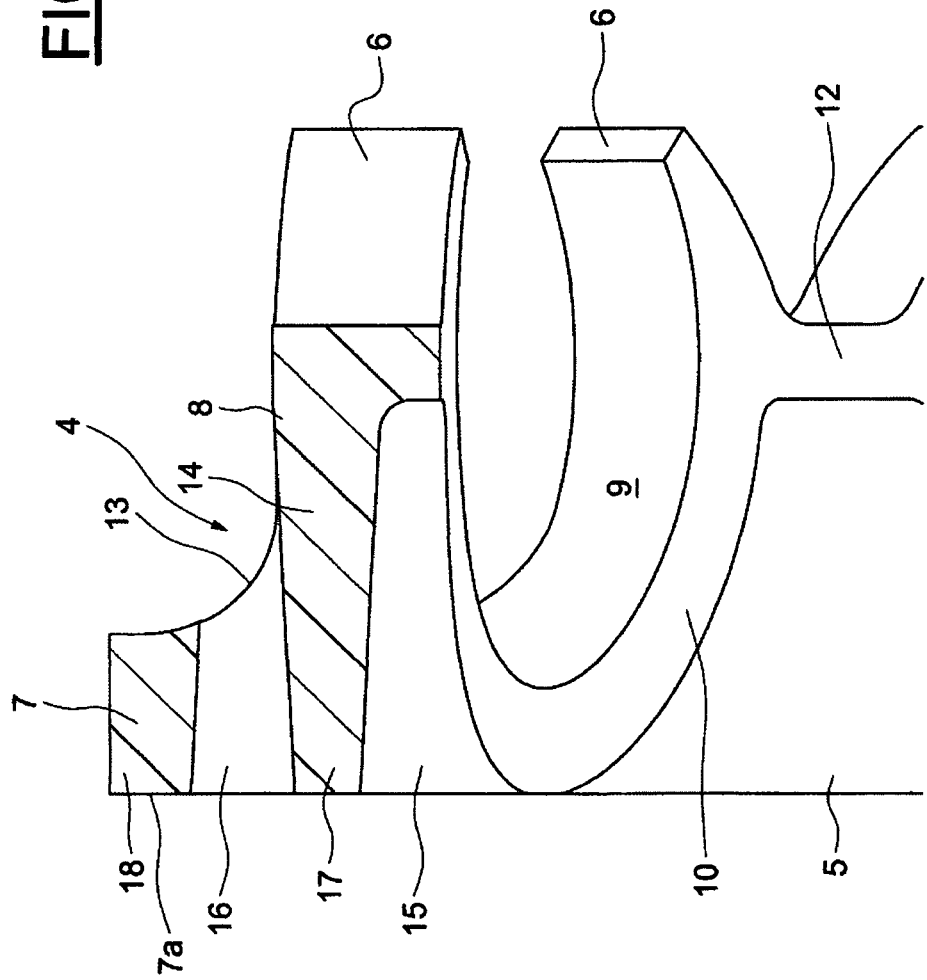
FIG. 5 is a half-view in cross section through an axial plane of the cage of FIG. 3.
Figure 6:
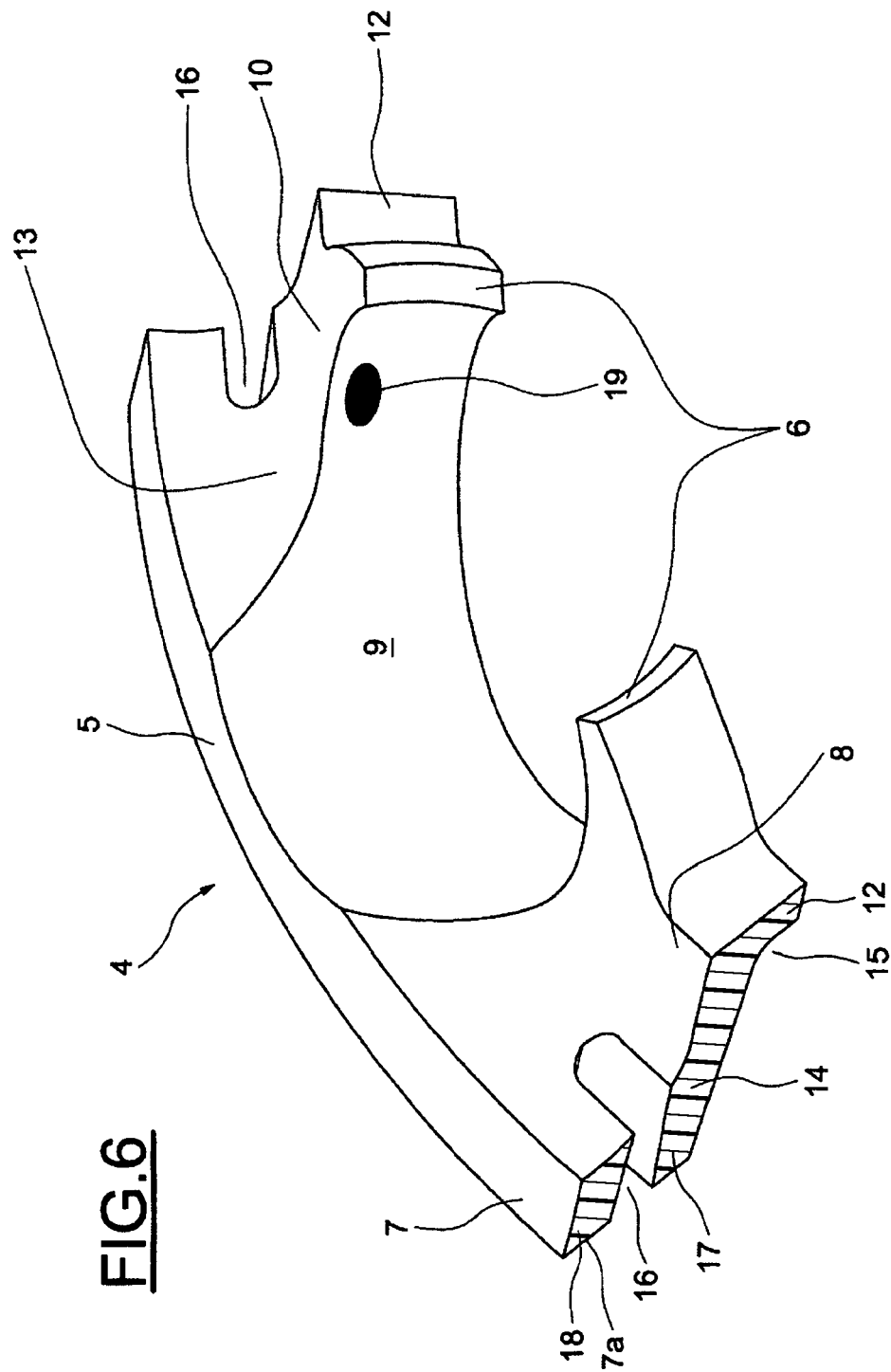
FIG. 6 is a detail view of the cage of FIG. 3.

The free spaces 16 are arranged in the heel 7 and in the connection 13; see more particularly FIGS. 5 and 6. The external free spaces 16 have the shape of an arched slot following the general curvature of the heel 7 emerging on the end surface 7a of the heel 7 in an opening that is of oblong shape and emerging on the opposite side in the connection 13 in an opening that is also oblong. The external free spaces 16 may extend axially on the periphery of the axial portion in order to form dishes 16a that are radially recessed relative to the external edge of the recesses (see FIG. 4). The radial dimension of the external free spaces 16 may reduce from the end surface 7a of the heel 7 to the connection 13, see FIG. 5. Similarly, the angular dimension of the external free spaces 16 may diminish from the end surface 7a of the heel 7 to the connection 13. The external free spaces 16 may be situated slightly beyond the pitch diameter of the cage 4. Therefore, the external free spaces 16 are arranged radially beyond the branches 10 which can maintain a high rigidity. As an example, the pitch diameter of the cage may be flush with the external surface of the substantially axial portion 8.

As is seen in particular in FIG. 4, the heel 7, angularly at the level of the external free spaces 16, is divided into two rings, an internal ring 17 and an external ring 18 spaced apart radially thereby making it possible to allow said external free spaces 16 to subsist. The rings 17 and 18 which leave the external base surface 7a of the heel 7 meet level with the recesses 9 while merging with the branches 10 in order to form a common trunk.

As can be seen more particularly in FIG. 6, the balls come mainly into contact with a zone 19 of the recesses 9 that is relatively limited in surface area and situated axially at the level of the ribs 12. The forces exerted by a ball on the contact zone 19 of a cage 4 are therefore absorbed, not only by the corresponding branch 10, but also by the rib 12 and the branch 10 of the next recess. The force that is exerted at a tangent to the recess 9 is also absorbed by the axial partition 14. The cage 4 therefore has excellent rigidity to the circumferential forces exerted by the balls on said cages.

Furthermore, the hollowed structure of the cage 4, notably thanks to the free spaces 15 and 16, allows the weight of the cage 4 to be lightened by reducing the quantity of material used, hence a reduction in the centrifugal forces during a high-speed rotation. The radial rigidity is nevertheless fully satisfactory, notably thanks to the ribs 12 and to the branches 10 which have a significant radial thickness. This prevents an awkward outward deformation of the cage 4, in particular at the clamps 6.

The presence of the internal free spaces 15 makes it possible to have a considerable reserve of lubricant close to the recesses 9 and the rolling elements 3. The external free spaces 16 may also perform a function of a lubricant reservoir and a function as a channel for the circulation of lubricant originating from the side of the end surface 7a of the heel 7 to the connection 13. The lubricant emerging from the opening of the external free space 16 in the connection 13 may either move outward by centrifugal effect and reach the raceway 1d of the outer race 1, or move angularly and join the rolling elements 3 placed in the recesses 9.

Figure 7:
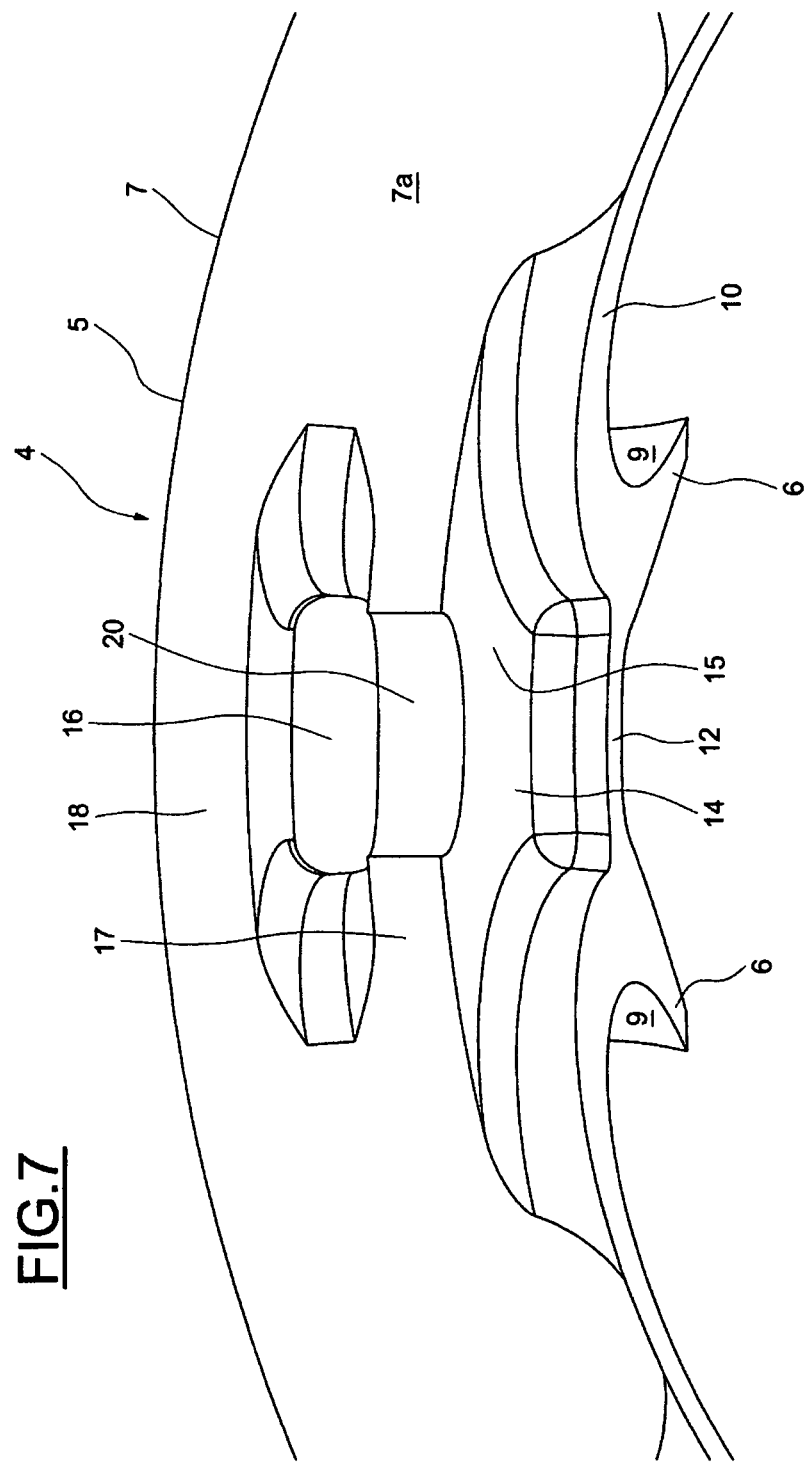
FIG. 7 is a partial rear view of a cage according to another embodiment.
Figure 8:
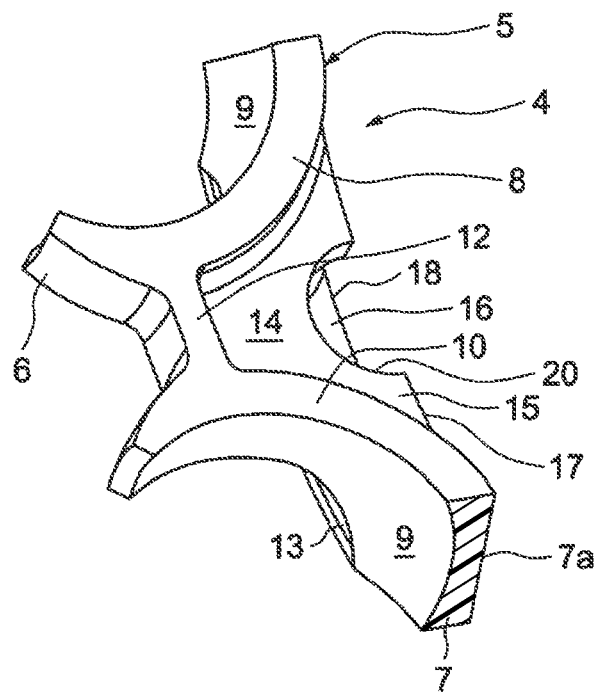
FIG. 8 is a partial view in perspective of the cage of FIG. 7.

In the embodiment illustrated in FIGS. 7 and 8, the reference numbers of similar elements to the preceding embodiment have been retained. Notches 20 are arranged in the axial partition 14 from the end surface 7a of the heel 7. Therefore, the notches 20 form an interruption in the internal ring 17. The notches 20 place the internal free spaces 15 and external free spaces 16 in communication and do so within the overall space requirement of the cage 4 and therefore allow a circulation of lubricant from the internal free space 15 to the external free space 16 and consequently a better circulation of the lubricant toward the raceway 1d of the outer race 1 or else toward the rolling elements 3 placed in the recesses 9. The notches 20 are particularly useful if the axial distance between the end surface 7a of the heel 7 and the sealing flange of the bearing is small, which is often the case in compact bearings.

In one embodiment, a lubricant, for example a grease, is placed in the internal and external free spaces forming a lubricant reservoir.

In another embodiment, a short lifetime lubricant is placed on the outside of the cage, notably in the external free spaces 16 and a long lifetime lubricant is placed on the side of the bore of the cage, in particular in the internal free spaces 15. The short lifetime lubricant is centrifuged toward the outer raceway 1d when the bearing begins to rotate in order to ensure immediate lubrication. The long lifetime lubricant takes over from the short lifetime lubricant by diffusing more slowly in the bearing. In one variant, the short lifetime lubricant is placed on the outside of the cage and the long lifetime lubricant is placed in the internal free spaces 15 and external free spaces 16. The lubricants may be greases of different viscosities.

The cage also has the advantage of making the bearing easier to clean, a step which takes place after the cage is installed, during the assembly process. Specifically, the cleaning liquid inserted into the bearing can circulate more easily between the outer race 1 and inner race 2 and thereby more effectively carry the contaminating particles which could otherwise remain in the bearing and be harmful to its correct operation.

As can be seen particularly clearly in FIGS. 4 to 8, the axial partitions 14 are stiffened radially by the branches 10 and the ribs 12 which have a markedly greater radial thickness. The cage is therefore properly stiffened both in the radial direction and in the angular direction.

The invention claimed is:

1. A cage for a ball bearing, the cage comprising:
a generally annular body and a plurality of clamps, the body including a substantially annular heel and a substantially axial portion connected to the heel and defining a plurality of recesses each configured to receive a ball, the substantially axial portion supporting said clamps on the side axially opposite to the heel, an external diameter of the heel being greater than that of the axial portion and the cage further including an axial partition located between the recesses and extending axially from the heel to the clamps, the axial partition being configured to define external free spaces and internal free spaces on either radial side of said axial partition, and wherein
two different lubricants are placed within the cage, at least one lubricant being located within the internal free spaces.

2. The cage as claimed in claim 1, wherein the external free spaces include cavities passing axially through the heel of the cage and emerging axially on either side of said heel.

3. The cage as claimed in claim 1, wherein the heel has an end face opposite the clamps and the internal free spaces extend radially into the heel and form openings in the heel end face.

4. The cage as claimed in claim 1, wherein the axial partition includes at least one opening allowing communication between each of the external free spaces and the opposing internal free spaces.

5. The cage as claimed in claim 4, wherein the heel as an end face opposite the clamps and said at least one opening is formed as a notch extending into the axial partition from the end face of the heel.

6. The cage as claimed in claim 1, wherein the axial partition extends between the recesses in the circumferential direction and is located substantially within a circle.

7. The cage as claimed in claim 1, wherein the axial partition has an external diameter that is substantially equal to the pitch diameter of the cage.

8. A rolling bearing comprising:
- a ball bearing cage including a generally annular body and a plurality of clamps, the body including a substantially annular heel and a substantially axial portion connected to the heel and defining a plurality of recesses each configured to receive a ball, the substantially axial portion supporting said clamps on the side axially opposite to the heel, an external diameter of the heel being greater than that of the axial portion and the cage further including an axial partition located between the recesses and extending axially from the heel to the clamps, the axial partition being configured to define external free spaces and internal free spaces on either radial side of said axial partition; and
- balls mounted in the recesses of the cage and placed between two raceways, and wherein
- two different lubricants are placed within the cage, at least one lubricant being located within the internal free spaces.

* * * * *